United States Patent
Schediwy

(10) Patent No.: US 9,557,857 B2
(45) Date of Patent: Jan. 31, 2017

(54) INPUT DEVICE WITH FORCE SENSING AND HAPTIC RESPONSE

(75) Inventor: Richard R. Schediwy, Union City, CA (US)

(73) Assignee: Synaptics Incorporated, San Jose, CA (US)

(*) Notice: Subject to any disclaimer, the term of this patent is extended or adjusted under 35 U.S.C. 154(b) by 1035 days.

(21) Appl. No.: 13/094,658

(22) Filed: Apr. 26, 2011

(65) Prior Publication Data

US 2012/0274599 A1  Nov. 1, 2012

(51) Int. Cl.
*G06F 3/01* (2006.01)
*G06F 3/0354* (2013.01)
*G06F 3/041* (2006.01)
*G06F 3/044* (2006.01)

(52) U.S. Cl.
CPC ............... *G06F 3/044* (2013.01); *G06F 3/016* (2013.01); *G06F 2203/04105* (2013.01)

(58) Field of Classification Search
CPC .......... G06F 3/041; G06F 3/044; G06F 3/045; G06F 3/016; G06F 3/03547; G06F 3/02; G06F 3/0338; G06F 3/0414–3/0146; G06F 2203/04105; H03K 17/962
USPC ......................................... 345/173, 174, 156
See application file for complete search history.

(56) References Cited

U.S. PATENT DOCUMENTS

| | | |
|---|---|---|
| 4,290,052 A | 9/1981 | Eichelberger et al. |
| 4,719,538 A | 1/1988 | Cox |
| 5,492,020 A | 2/1996 | Okida |
| 5,510,813 A | 4/1996 | Makinwa et al. |
| 5,854,625 A | 12/1998 | Frisch et al. |
| 5,942,733 A | 8/1999 | Allen et al. |

(Continued)

FOREIGN PATENT DOCUMENTS

| | | |
|---|---|---|
| JP | 7280671 A | 10/1995 |
| JP | 2009009249 A1 | 1/2001 |

(Continued)

OTHER PUBLICATIONS

International Bureau, International Search Report and Written Opinion for International Application No. PCT/US2012/060500 dated Jan. 2, 2013.

(Continued)

*Primary Examiner* — William Boddie
*Assistant Examiner* — Bryan Earles
(74) *Attorney, Agent, or Firm* — Osha Liang LLP

(57) ABSTRACT

Devices and methods are provided that facilitate improved input device performance. The devices and methods utilize a first electrode disposed on a first substrate, a second electrode coupled to a first side of a piezoelectric material and a third electrode coupled to a second side of the piezoelectric material. The second electrode and the third electrode are configured to facilitate actuation of the piezoelectric material, while the first electrode and the second electrode define at least part of a variable capacitance that facilitates force determination. A spacing element is coupled to the first substrate and defines a spacing between the first electrode and the second electrode. A transmission element is coupled to the third electrode and configured such that a force biasing the transmission element causes the second electrode to deflect relative to the first electrode, thus changing the variable capacitance.

12 Claims, 13 Drawing Sheets

(56) References Cited

U.S. PATENT DOCUMENTS

| | | | |
|---|---|---|---|
| 5,945,980 | A | 8/1999 | Moissev et al. |
| 5,973,668 | A | 10/1999 | Watanabe |
| 6,002,389 | A | 12/1999 | Kasser |
| 6,215,476 | B1 | 4/2001 | Depew et al. |
| 6,642,857 | B1 | 11/2003 | Schediwy et al. |
| 6,888,537 | B2 | 5/2005 | Benson et al. |
| 6,958,614 | B2 | 10/2005 | Morimoto |
| 7,047,818 | B2 | 5/2006 | Dallenbach et al. |
| 7,148,882 | B2 | 12/2006 | Kamrath et al. |
| 7,196,694 | B2 | 3/2007 | Roberts |
| 7,398,587 | B2 | 7/2008 | Morimoto |
| 7,451,659 | B2 | 11/2008 | Dallenbach et al. |
| 7,499,040 | B2 | 3/2009 | Zadesky et al. |
| 7,656,465 | B2 | 2/2010 | Takeda et al. |
| 7,728,487 | B2 | 6/2010 | Adachi et al. |
| 7,743,667 | B2 | 6/2010 | Harish et al. |
| 7,784,366 | B2 | 8/2010 | Daverman et al. |
| 7,786,655 | B2 | 8/2010 | Park et al. |
| 7,903,091 | B2 | 3/2011 | Lee et al. |
| 8,120,229 | B2 | 2/2012 | Huang |
| 8,169,416 | B2 | 5/2012 | Han |
| 8,698,769 | B2 | 4/2014 | Coulson et al. |
| 2002/0019711 | A1 | 2/2002 | Miyashita et al. |
| 2003/0151589 | A1 | 8/2003 | Bensen et al. |
| 2004/0112149 | A1 | 6/2004 | Gebert |
| 2004/0155991 | A1 | 8/2004 | Lowles et al. |
| 2004/0227736 | A1* | 11/2004 | Kamrath et al. ............... 345/173 |
| 2005/0052425 | A1 | 3/2005 | Zadesky et al. |
| 2005/0057266 | A1 | 3/2005 | Morimoto |
| 2005/0057528 | A1 | 3/2005 | Kleen |
| 2005/0061082 | A1 | 3/2005 | Dallenbach et al. |
| 2006/0017701 | A1 | 1/2006 | Marten et al. |
| 2006/0197753 | A1 | 9/2006 | Hotelling |
| 2007/0063982 | A1 | 3/2007 | Tran |
| 2007/0229464 | A1 | 10/2007 | Hotelling et al. |
| 2007/0229470 | A1 | 10/2007 | Snyder et al. |
| 2007/0236450 | A1 | 10/2007 | Colgate et al. |
| 2007/0257821 | A1 | 11/2007 | Son et al. |
| 2007/0268265 | A1 | 11/2007 | XiaoPing |
| 2008/0018608 | A1 | 1/2008 | Serban et al. |
| 2008/0018611 | A1 | 1/2008 | Serban et al. |
| 2008/0062148 | A1 | 3/2008 | Hotelling et al. |
| 2008/0068348 | A1 | 3/2008 | Rosenberg et al. |
| 2008/0142352 | A1 | 6/2008 | Wright |
| 2008/0202251 | A1 | 8/2008 | Serban et al. |
| 2008/0202824 | A1 | 8/2008 | Philipp et al. |
| 2009/0002328 | A1* | 1/2009 | Ullrich et al. ................ 345/173 |
| 2009/0160682 | A1 | 6/2009 | Bolender et al. |
| 2009/0160763 | A1 | 6/2009 | Cauwels et al. |
| 2009/0167704 | A1* | 7/2009 | Terlizzi et al. ............... 345/173 |
| 2009/0243817 | A1 | 10/2009 | Son |
| 2009/0244017 | A1 | 10/2009 | Pala et al. |
| 2009/0267892 | A1 | 10/2009 | Faubert |
| 2010/0018889 | A1 | 1/2010 | Korpanty et al. |
| 2010/0020039 | A1 | 1/2010 | Ricks et al. |
| 2010/0024573 | A1 | 2/2010 | Daverman et al. |
| 2010/0026664 | A1 | 2/2010 | Geaghan |
| 2010/0033354 | A1 | 2/2010 | Ejlersen |
| 2010/0079384 | A1 | 4/2010 | Grivna |
| 2010/0090813 | A1 | 4/2010 | Je et al. |
| 2010/0107770 | A1 | 5/2010 | Serban et al. |
| 2010/0108409 | A1 | 5/2010 | Tanaka et al. |
| 2010/0149128 | A1 | 6/2010 | No et al. |
| 2010/0156814 | A1* | 6/2010 | Weber et al. ................. 345/173 |
| 2010/0244628 | A1 | 9/2010 | Nishigaki et al. |
| 2010/0250071 | A1 | 9/2010 | Pala et al. |
| 2011/0005845 | A1 | 1/2011 | Hotelling et al. |
| 2011/0025631 | A1 | 2/2011 | Han |
| 2011/0148811 | A1 | 6/2011 | Kanehira et al. |
| 2011/0148812 | A1 | 6/2011 | Hente |
| 2011/0175844 | A1 | 7/2011 | Berggren |
| 2011/0278078 | A1 | 11/2011 | Schediwy et al. |
| 2012/0075243 | A1 | 3/2012 | Doi et al. |
| 2012/0086307 | A1 | 4/2012 | Kandori et al. |
| 2012/0090902 | A1* | 4/2012 | Liu et al. .................... 178/18.03 |
| 2012/0098783 | A1 | 4/2012 | Badaye et al. |
| 2012/0105333 | A1* | 5/2012 | Maschmeyer et al. ....... 345/173 |
| 2012/0242610 | A1 | 9/2012 | Yasumatsu |

FOREIGN PATENT DOCUMENTS

| | | | |
|---|---|---|---|
| WO | 9718528 | | 5/1997 |
| WO | 2005121729 | A1 | 12/2005 |
| WO | 2007098171 | A3 | 8/2007 |
| WO | 2009157614 | A1 | 12/2009 |
| WO | 2010018889 | A1 | 2/2010 |
| WO | WO 2010146838 | A2 * | 12/2010 ........... B60B 1/0292 |

OTHER PUBLICATIONS

USPTO "Final Office Action" mailed Aug. 2, 2012 for U.S. Appl. No. 12/418,433, filed Apr. 3, 2009.

USPTO, Final Office Action in U.S. Appl. No. 12/777,829, mailed Mar. 6, 2014.

USPTO, Office Action in U.S. Appl. No. 12/418,433, mailed Mar. 20, 2014.

USPTO, Office Action in U.S. Appl. No. 13/316,279, mailed Mar. 28, 2014.

USPTO, Response to Non-Final Office Action in U.S. Appl. No. 12/777,829, mailed Nov. 25, 2013.

USPTO, Response to Final Office Action in U.S. Appl. No. 12/418,433, mailed Jan. 21, 2014.

USPTO, Response to Restriction Requirement in U.S. Appl. No. 13/316,279, mailed Feb. 11, 2014.

International Bureau, International Preliminary Report on Patentability in Application No. PCT/US2012/052909, dated Mar. 25, 2014.

International Search Report PCT/US2010/029823 dated Nov. 19, 2010.

USPTO, Final Office Action in U.S. Appl. No. 12/418,433, mailed Jul. 19, 2013.

USPTO, Office Action in U.S. Appl. No. 12/777,829, mailed Jul. 23, 2013.

The International Bureau of WIPO, International Preliminary Report on Patentability mailed Nov. 7, 2013 for International Application No. PCT/US2012/034540.

USPTO, Office Action mailed Oct. 28, 2013 for U.S. Appl. No. 13/238,783.

USPTO, U.S. Non-Final Office Action mailed Sep. 20, 2012 for U.S. Appl. No. 12/777,829, filed May 11, 2010.

International Bureau, Preliminary Report on Patentability for International Application No. PCT/US2011/034261 dated Nov. 22, 2012.

International Bureau, International Search Report and Written Opinion for International Application No. PCT/US2012/034540 dated Nov. 30, 2012.

Korean Intellectual Property Office, International Searching Authority, "International Search Report" mailed Feb. 8, 2012; International Appln. No. PCT/US2011/034261, filed Apr. 28, 2011.

USPTO "Non-Final Office Action" mailed Feb. 3, 2012; U.S. Appl. No. 12/418,433, filed Apr. 3, 2009.

International Bureau, International Search Report and Written Opinion for International Application No. PCT/US2012/052909 dated Dec. 26, 2012.

United States Patent and Trademark Office, US Non-final Office Action for U.S. Appl. No. 12/418,433, dated Jan. 7, 2013.

USPTO, US Final Office Action issued in U.S. Appl. No. 12/777,829, mailed Feb. 22, 2013.

USPTO, Final Office Action for U.S. Appl. No. 13/316,279, mailed Aug. 14, 2014.

USPTO, Response to Non-Final Office Action in U.S. Appl. No. 13/238,783, mailed Jan. 20, 2014.

USPTO, Non-Final Office Action in U.S. Appl. No. 13/238,783, mailed Apr. 23, 2014.

USPTO, Non-Final Office Action in U.S. Appl. No. 12/777,829, mailed May 2, 2014.

USPTO, Final Office Action for U.S. Appl. No. 12/418,433, mailed Sep. 29, 2014.

(56) References Cited

OTHER PUBLICATIONS

USPTO, Final Office Action for U.S. Appl. No. 12/777,829, mailed Oct. 29, 2014.
USPTO, Final Office Action for U.S. Appl. No. 13/238,783, mailed Nov. 6, 2014.
USPTO, Office Action mailed Apr. 1, 2016, for U.S. Appl. No. 13/238,783 (14 pages).
Office Action in Corresponding Chinese Application No. 201280046102.6 dated Mar. 23, 2016 (20 pages).

* cited by examiner

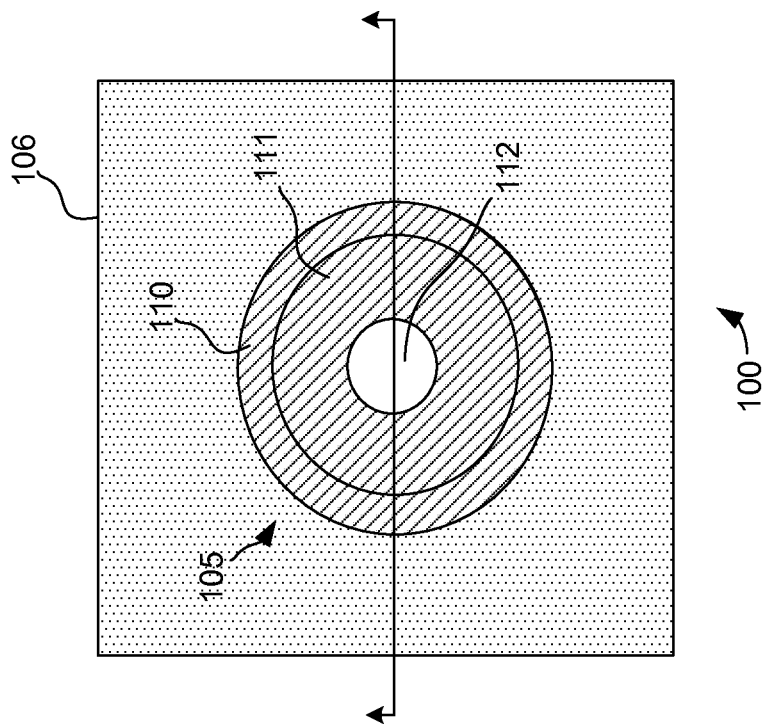
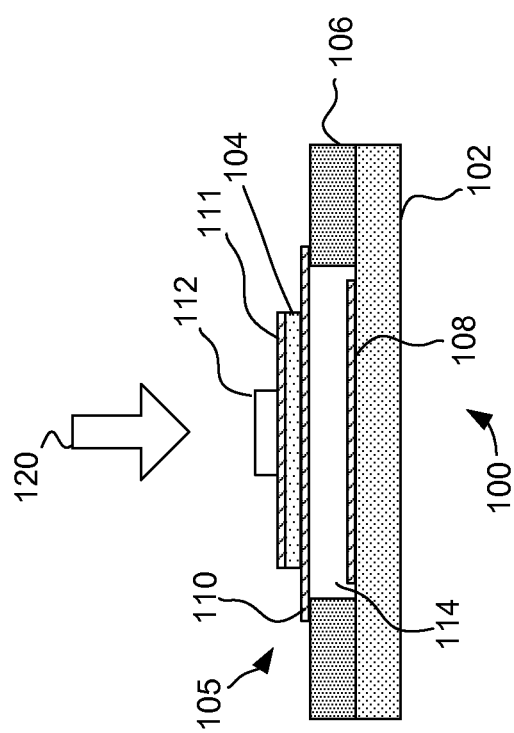
FIG. 1B
FIG. 1A

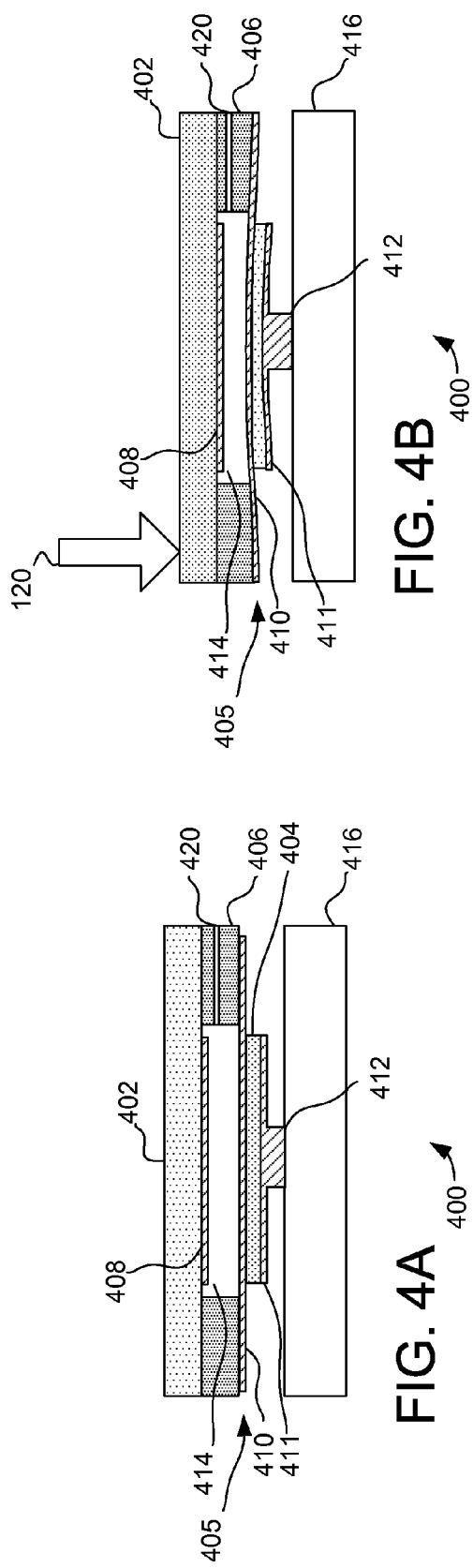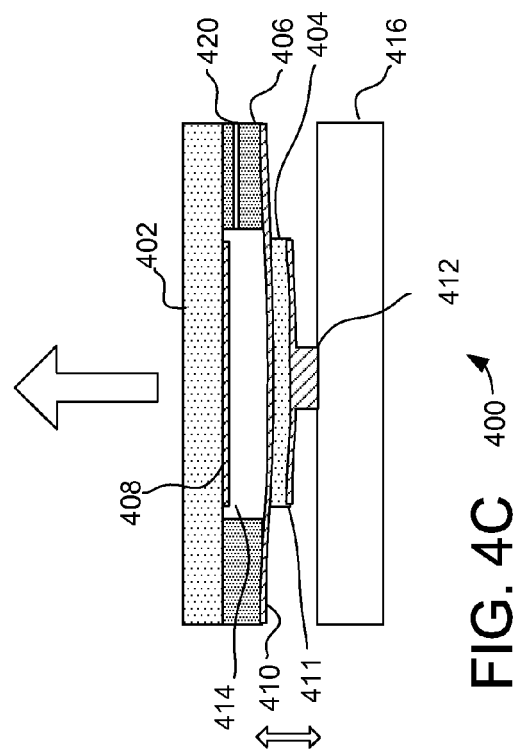

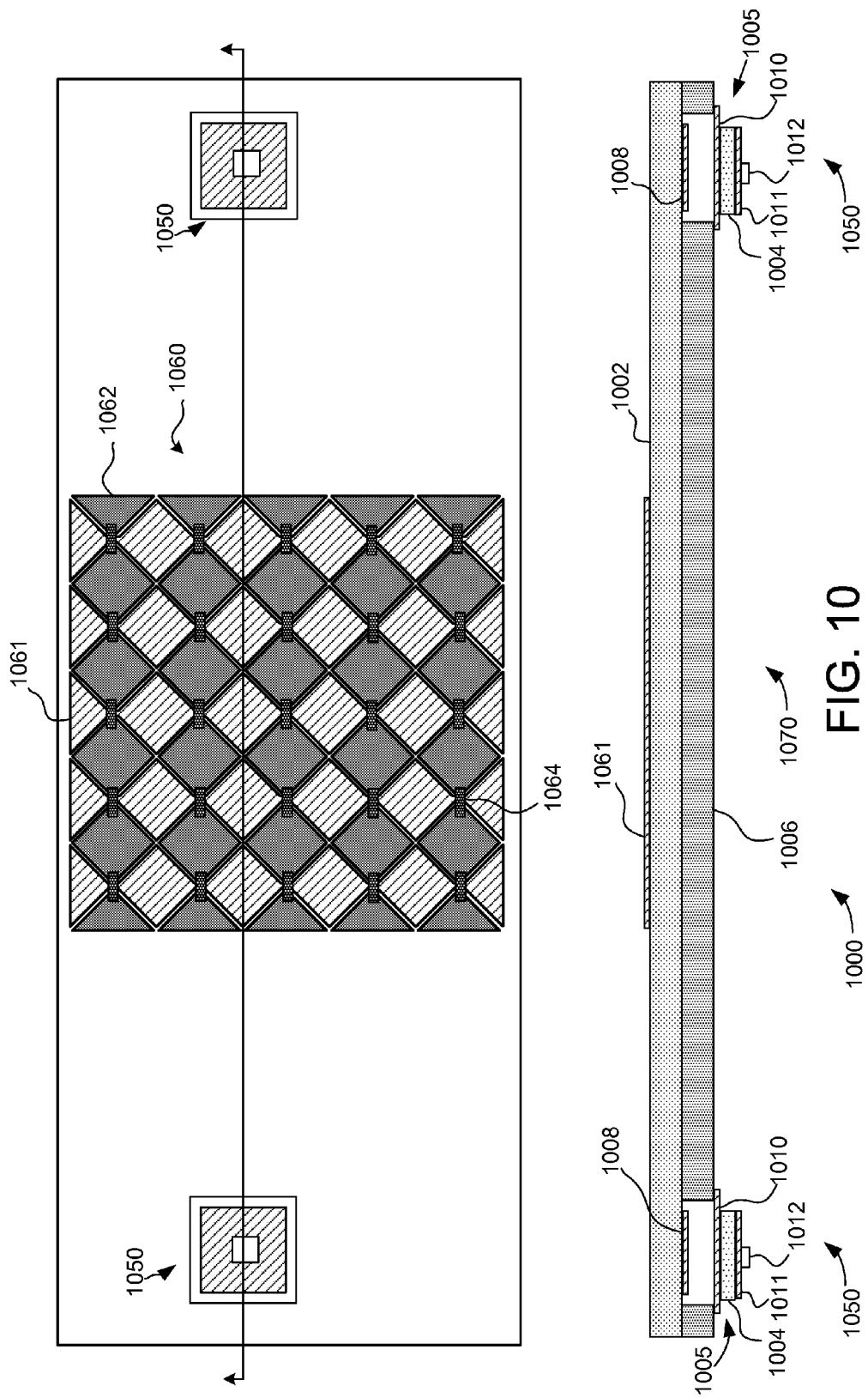

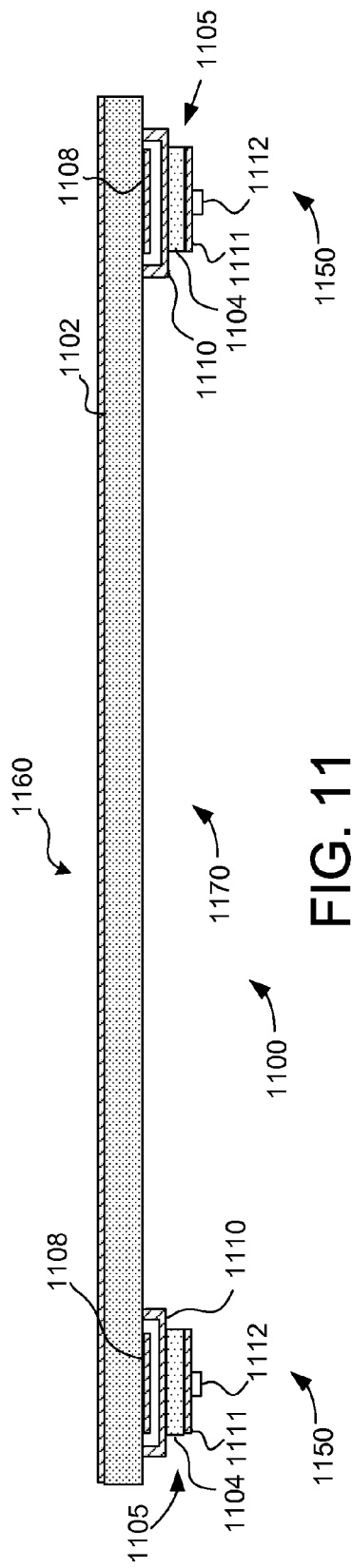

INPUT DEVICE WITH FORCE SENSING AND HAPTIC RESPONSE

FIELD OF THE INVENTION

This invention generally relates to electronic devices, and more specifically relates to input devices, such as proximity sensor devices and force sensor devices.

BACKGROUND OF THE INVENTION

Proximity sensor devices (also commonly called touch sensor devices) are widely used in a variety of electronic systems. A proximity sensor device typically includes a sensing region, often demarked by a surface, in which input objects can be detected. Example input objects include fingers, styli, and the like. The proximity sensor device can utilize one or more sensors based on capacitive, resistive, inductive, optical, acoustic and/or other technology. Further, the proximity sensor device may determine the presence, location and/or motion of a single input object in the sensing region, or of multiple input objects simultaneously in the sensor region.

The proximity sensor device can be used to enable control of an associated electronic system. For example, proximity sensor devices are often used as input devices for larger computing systems, including: notebook computers and desktop computers. Proximity sensor devices are also often used in smaller systems, including: handheld systems such as personal digital assistants (PDAs), remote controls, and communication systems such as wireless telephones and text messaging systems. Increasingly, proximity sensor devices are used in media systems, such as CD, DVD, MP3, video or other media recorders or players. The proximity sensor device can be integral or peripheral to the computing system with which it interacts.

In the past, some proximity sensors have been implemented with additional ability to detect and determine force applied to a surface of the sensor. For example, by making an estimation of applied force by measuring the increased capacitance that is the result of the increased contact area when a finger is pressed against the surface. Unfortunately, some implementations of these proximity sensors have had limited accuracy when estimating applied force using these techniques. Because of questionable accuracy, such sensors have typically had limited ability to use such determined force as a basis for determining user input. This limits the flexibility of the proximity sensor device to function as an input device. Thus, there exists a need for improvements in proximity sensor device, and in particular, the ability of proximity sensor devices to determine and respond to indications of applied force.

Furthermore, it is desirable in some applications to provide feedback to users of proximity sensor devices. Specifically, it is desirable in many devices to provide force and motion at the surface of the device where it may be felt by the user. This is commonly referred to as "haptic" feedback. Haptic feedback may be used to let a user know when certain actions are occurring or about to occur on a device. Thus, there exists a continuing need for improvements in proximity sensor device, and in particular, the ability of proximity sensor devices to provide haptic feedback to users of such devices.

Other desirable features and characteristics will become apparent from the subsequent detailed description and the appended claims, taken in conjunction with the accompanying drawings and the foregoing technical field and background.

BRIEF SUMMARY OF THE INVENTION

Devices and methods are provided that facilitate improved input device performance. The devices and methods utilize a first electrode disposed on a first substrate, a second electrode coupled to a first side of a piezoelectric material and a third electrode coupled to a second side of the piezoelectric material. The second electrode and the third electrode are configured to facilitate actuation of the piezoelectric material, while the first electrode and the second electrode define at least part of a variable capacitance that facilitates force determination. A spacing element is coupled to the first substrate and defines a spacing between the first electrode and the second electrode. A transmission element is coupled to the third electrode and configured such that a force biasing the transmission element causes the second electrode to deflect relative to the first electrode, thus changing the variable capacitance.

In one embodiment, a processing system is communicatively coupled to the first, second and third electrodes. In this embodiment, the processing system may be configured to determine force information based on a capacitance value of the variable capacitance. Furthermore, the processing system may be configured to actuate the piezoelectric material by selectively applying one or more differential voltages across the second and third electrodes. This may be used to provide haptic feedback to a user of the device. Thus, an input device and method may be provided that uses the same electrode for both haptic feedback and force information determination. Stated another way, these implementations facilitate force sensing and haptic response to be provided with reduced cost and complexity.

Thus, the various embodiments provide improved input device performance by facilitating the determination of force information for one or more input objects.

BRIEF DESCRIPTION OF DRAWINGS

The preferred exemplary embodiment of the present invention will hereinafter be described in conjunction with the appended drawings, where like designations denote like elements, and:

FIG. 4 are cross-sectional side views of a force sensor in accordance with an embodiment of the invention;

FIGS. 8-11 are side and top views of input devices in accordance with embodiments of the invention.

DETAILED DESCRIPTION OF THE INVENTION

Figure 1C:
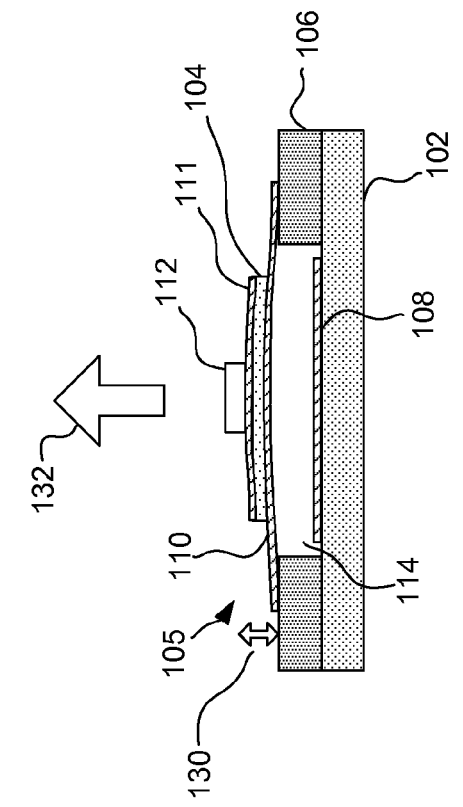
FIG. 1 are cross-sectional side views and a top view of a force sensor in accordance with an embodiment of the invention.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Devices and methods are provided that facilitate improved input device performance. Specifically, the devices and methods provide an input device with force sensing and haptic feedback in a cost effective and efficient manner. Turning now to FIGS. 1A-1F, cross-sectional and partial top views of an input device 100 is illustrated. The input device 100 includes a first substrate 102, a spacing element 106, a first electrode 108, a transmission element 112 and a piezoelectric assembly 105 comprising a piezoelectric material 104, a second electrode 110, and a third electrode 111. The spacing element 106 includes a spacing 114 that is positioned between first substrate 102 and the piezoelectric assembly 105. The spacing 114 is arranged such that at least a portion of the first electrode 108 and the second electrode 110 overlap the spacing 114. The transmission element 112 is dimensioned to fit within the perimeter of the spacing 114. As will be discussed in greater detail below, in some embodiments, the transmission element may be integrated with the piezoelectric assembly 105. Likewise, in some embodiments the spacing element 106 may be integrated with the piezoelectric assembly.

The first electrode 108 and the second electrode 110 define at least part of a variable capacitance. Measurements of this variable capacitance may be determined and used to determine force information regarding a force that is biasing the transmission element 112. Specifically, the transmission element 112 is physically coupled to the piezoelectric assembly 105 such that when an input object (such as a finger) applies force (represented by arrow 120), the transmission element 112 causes the second electrode to bias relative to the first electrode, thus changing the variable capacitance. A measurement of the change variable capacitance can be used to determine force information regarding the force biasing the transmission element 112.

An example of such force biasing is illustrated in FIG. 1C. As illustrated in FIG. 1C, an increase in the force biasing the transmission element 112 (as represented by a longer arrow 120) causes the piezoelectric assembly 105 to deform, allowing the second electrode 110 to move relative to the first electrode 108. As the distance between the first electrode 108 and the second electrode 110 changes, the variable capacitance defined in part by electrodes 108 and 110 changes. A measurement of the variable capacitance between electrodes can thus be used to determine force information for the object providing the biasing force.

In some implementations, such an input device 100 can have a relatively linear response to force. That is, as force is applied and biases the transmission element 112, the resulting change in capacitance is a function of the amount of relative movement between the first electrode 108 and the second electrode 110. Likewise, the amount of bias is a function of the force applied to the transmission element 112. With the appropriate selection of materials and geometries, the input device 100 may provide an accurate and useful measure of applied force.

In one embodiment, a touch layer, and in some cases other additional layers would cover the transmission element 112. In another embodiment, a touch layer, and in some cases other additional layers would cover the first substrate 102. In these embodiments, an input object such as a finger applies force through these additional layers, to the transmission element 112. The transmission element 112 "transmits" that force through the piezoelectric assembly 105, causing the second electrode 110 to move relative to first electrode 108.

Figure 1D:
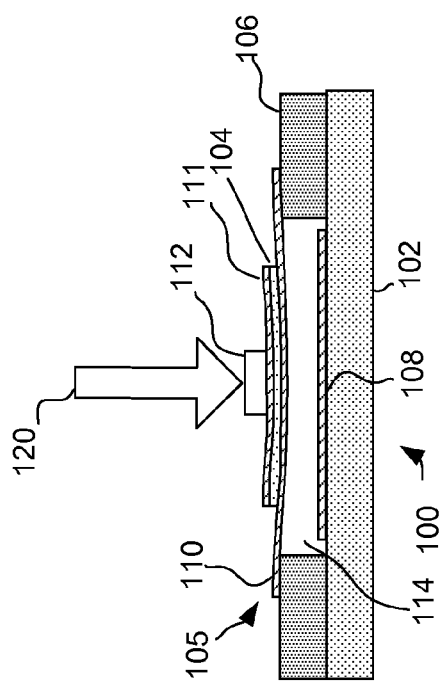

In this embodiment, the second electrode 110, the third electrode 111 and the piezoelectric material 104 make up the piezoelectric assembly 105 that functions to provide flexing in response to force. The second electrode 110, third electrode 111 and piezoelectric material 104 are also configured to actuate the piezoelectric assembly 105. Specifically, by selectively applying one or more differential voltages to the second electrode 110 and third electrode 111, the piezoelectric assembly 105 may be actuated to provide haptic feedback to a user. An example of such haptic feedback is illustrated in FIG. 1D. As shown in this figure, a differential voltage change applied across the second electrode 110 and third electrode 111 causes the piezoelectric material 104 to deform (as represented by the double headed arrows 130) which causes a haptic response that (as represented by arrows 132) that is transmitted by the piezoelectric assembly 105 to the transmission element 112 such that it may be perceived by a user. It should noted that while this illustrated example shows the actuation of the piezoelectric material 104 as a "dishing"—that this is only one example. In other examples, the piezoelectric material 104 may deform or deflect in other directions and dimensions.

Figure 1E:
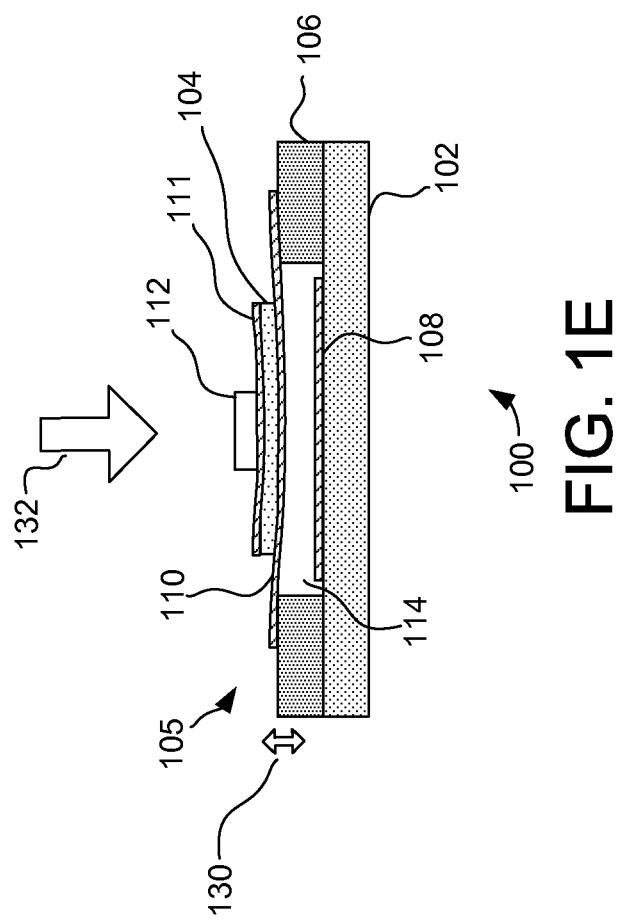

A second example of such haptic feedback is illustrated in FIG. 1E. As shown in this figure, a differential voltage change is applied across the second electrode 110 and third electrode 111 causes the piezoelectric material 104 to deform and which again causes a haptic response represented by arrow 132. However in this example, the piezoelectric assembly 105 is configured such that transmission element pulls toward the first substrate 102. This actuation may be likewise transmitted by the piezoelectric assembly 105 to the transmission element 112 such that it may be perceived by a user.

It should be appreciated that the piezoelectric assembly 105 is used both in providing the haptic response and in determining force information. Specifically, the second electrode 110 is used both in providing the haptic response and in deforming in response to force. This sharing of the piezoelectric assembly 105 for two purposes provides the ability to do both haptic response and force determination with reduced cost and complexity. It should be noted that the example implementation shown in FIGS. 1A-1E is merely one type of configuration that can be used. For example, the input device 100 shows an implementation where the piezoelectric assembly 105 comprises a pair of electrodes "surrounding" a piezoelectric material, the assembly providing the majority of the flexing used to facilitate force sensing. In other embodiments, the piezoelectric assembly may be arranged in a variety of other ways to provide flexing in response to force and actuation of the piezoelectric material to provide a haptic response.

Finally, it should be appreciated that the first electrode 108, second electrode 110 and a third electrode 111 are used collectively to provide the haptic response and in determining force information. As such, each of these electrodes may be considered a "response electrode" that may be used in the device for determining force information, providing haptic response, or both. Specifically, in the example of FIG. 1, the first electrode 108 may be considered a response electrode used for force information determination, the second electrode 110 may be considered a response electrode used for both force information determination and providing haptic response and the third electrode 111 may be considered a response electrode used for providing haptic response.

Figure 2A:
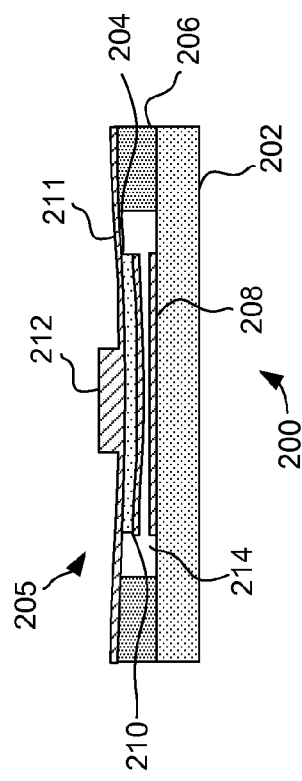
FIG. 2 are cross-sectional side views of a force sensor in accordance with an embodiment of the invention.
Figure 2B:
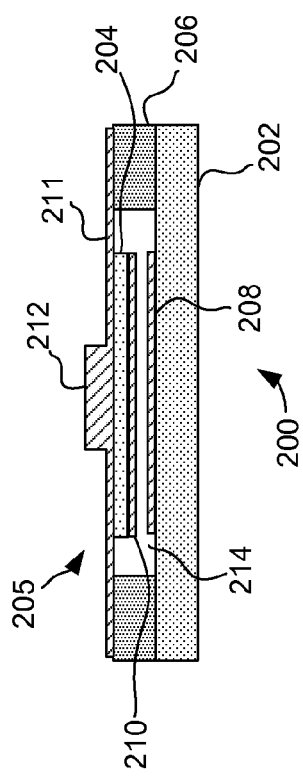
Figure 2C:
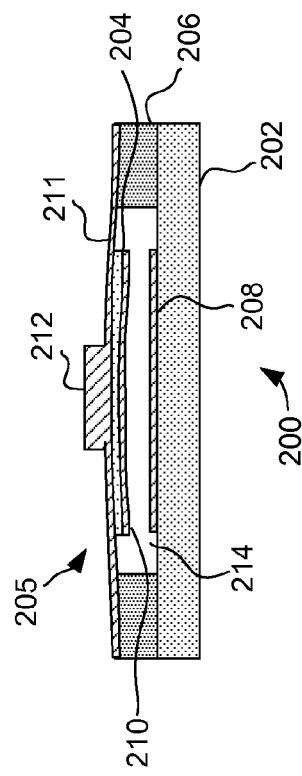

Turning now to FIGS. 2A-C, a cross-sectional view of an input device 200 is illustrated. The input device 200 includes a first substrate 202, a piezoelectric assembly 205, a spacing element 206, and a first electrode 208. In this embodiment, the piezoelectric assembly 205 comprises a piezoelectric material 204, a second electrode 210, a third electrode 211, and a transmission element 212. The spacing element 206 defines at least in part a spacing 214 that is positioned between first substrate 202 and the piezoelectric assembly 205.

In contrast with the embodiment illustrated in FIG. 1, in this embodiment the transmission element 212 is integrated with the piezoelectric assembly 205. Specifically, in this illustrated embodiment the transmission element 212 is formed as part of the third electrode 211. Specifically, the transmission element 212 comprises a relatively thick portion of the third electrode 211. It should be noted that this is just one example, and that the transmission element 212 could have a variety of different shapes configured to "transmit" any force applied through the piezoelectric assembly.

The embodiment of FIG. 2A is configured to operate similarly to the input device 100 illustrated in FIG. 1. However, in the embodiment of FIG. 2A, the piezoelectric assembly 205 is configured such that the third electrode 211 is coupled to the spacing element 206 and provides the majority of the flexing needed. Furthermore, the piezoelectric material 204 and the second electrode 210 are within the spacing 214. This embodiment allows the first electrode 208 to be physically closer to the second electrode 210, which may be desirable in some applications.

Furthermore, the first electrode 208 and the second electrode 110 define at least part of a variable capacitance. Measurements of this variable capacitance may be determined and used to determine force information regarding a force that is biasing the transmission element 212. Specifically, when an input object (such as a finger) applies force, the transmission element 212 causes the second electrode 210 to bias relative to the first electrode 208, thus changing the variable capacitance. A measurement of the change variable capacitance can be used to determine force information regarding the force biasing the transmission element 212.

An example of such force biasing is illustrated in FIG. 2B. As illustrated in FIG. 2B, an increase in the force biasing the transmission element 212 causes the piezoelectric assembly 205 to deform, allowing the second electrode 210 to move relative to the first electrode 208. Again, it should be noted that in this embodiment the third electrode 211 that provides the majority of flexing used to accommodate the force biasing of the transmission element 212.

As the distance between the first electrode 208 and the second electrode 210 changes, the variable capacitance defined in part by electrodes 208 and 210 changes. A measurement of the variable capacitance between electrodes can thus be used to determine force information for the object providing the biasing force.

The second electrode 210, third electrode 211 and piezoelectric material 204 are also configured to actuate the piezoelectric assembly 205. Specifically, by selectively applying one or more differential voltages to the second electrode 210 and third electrode 211, the piezoelectric assembly 205 may be actuated to provide haptic feedback to a user. An example of such haptic feedback is illustrated in FIG. 2C. As shown in this figure, a differential voltage change applied across the second electrode 210 and third electrode 211 causes the piezoelectric material 204 to deform which causes a haptic response that that is transmitted by the transmission element 212 such that it may be perceived by a user. Again, the actuation of the piezoelectric assembly 205 requires some flexing, and in this embodiment the majority of flexing is provided by the third electrode 211.

It should be noted that in this embodiment the second electrode 210 is used both in providing the haptic response and in determining force information. Furthermore, the piezoelectric assembly is used both in providing the haptic response and in deforming in response to force. This sharing of elements for two purposes provides the ability to do both haptic response and force determination with reduced cost and complexity.

Figure 3A:
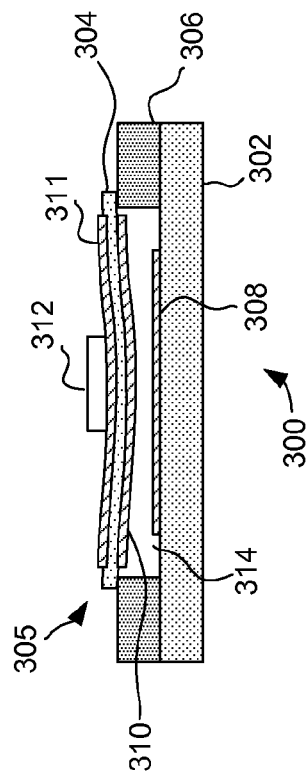
FIG. 3 are cross-sectional side views of a force sensor in accordance with an embodiment of the invention.
Figure 3B:
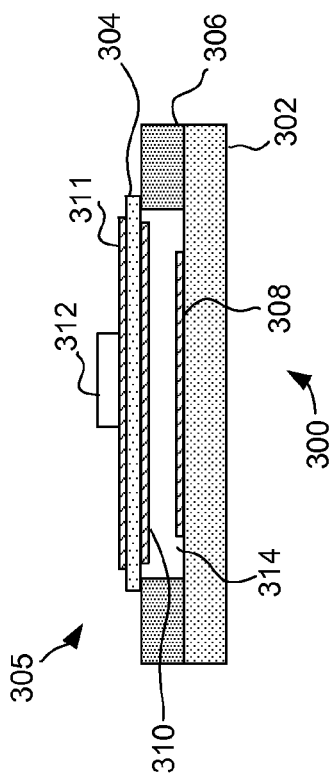
Figure 3C:
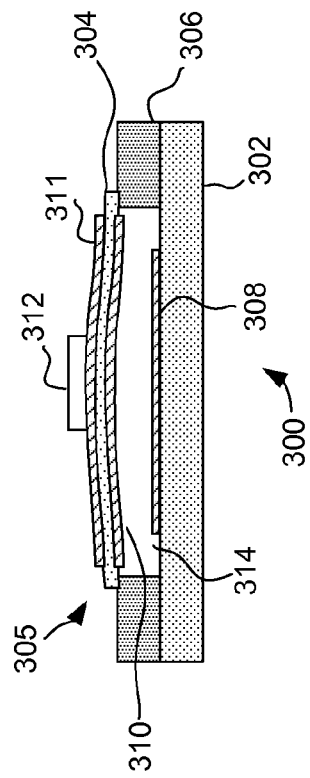

Turning now to FIGS. 3A-C, cross-sectional views of an input device 300 are illustrated. The input device 300 includes a first substrate 302, a piezoelectric material 304, a spacing element 306, a first electrode 308, a second electrode 310, a third electrode 311, and a transmission element 312. The spacing element 306 defines a spacing 314 that is positioned between first substrate 302 and the piezoelectric assembly 305.

Like the embodiment illustrated in FIG. 2, a piezoelectric assembly 305 functions to provide flexing in response to force. However, this embodiment the piezoelectric material 304 provide the majority of the flexing. This is illustrated in FIG. 3B, which shows a force biasing the transmission element 312 which causes the piezoelectric material 304 to deform, allowing the second electrode 310 to move relative to the first electrode 308.

The second electrode 310, third electrode 311 and piezoelectric material 304 are also configured to actuate the piezoelectric assembly 305 to provide haptic feedback to a user. An example of such haptic feedback is illustrated in FIG. 3C. As shown in this figure, a differential voltage change applied across the second electrode 310 and third electrode 311 causes the piezoelectric material 304 to deform which causes a haptic response that that is transmitted by the transmission element 312. Again, the actuation of the piezoelectric assembly 305 requires some flexing, and in this embodiment the majority of flexing is provided by the piezoelectric material 304.

These example implementations shown in FIGS. 1, 2 and 3 are merely one type of configuration that can be used. For example, these devices show an implementation where the transmission element (112, 212, or 312) is on the side of the input device near where force is applied by a user. That is, the transmission element is located between one or more of the substrates and where a finger or other input object would apply force. In other embodiments, the transmission element is positioned such that force from an input object is "indirectly" applied to the transmission element. Turning to FIGS. 4A-4C, such an embodiment of an input device 400 is illustrated. The input device 400 includes a first substrate 402, a piezoelectric assembly 405 spacing element 406, a first electrode 408, and a base substrate 416. The piezoelectric assembly 405 comprises a piezoelectric material 404, a second electrode 410 a third electrode 411, and a transmission element 412. Again, the spacing element 406 includes a spacing 414 that is positioned between first substrate 402 and the piezoelectric material 404. The spacing 414 is arranged such that at least a portion of the first electrode 408 and the second electrode 410 overlap the spacing 414. The transmission element 412 is dimensioned to fit within the perimeter of the spacing 414 and may also be relatively rigid compared the piezoelectric material 404.

In this embodiment, when an input object applies force to the input device 400, that force is "indirectly" applied to the transmission element 412. Specifically, the biasing force pushes the input device 400 against the base substrate 416, and thus indirectly applies force to the transmission element 412. Examples of such biasing are shown in FIG. 4B. Specifically, force applied by the input object causes an indirect application of force to the transmission element 412, which in turn causes the second electrode 410 to again move relative to the first electrode 408. This results in a change in the variable capacitance, such that a measurement of the change variable capacitance can be used to determine force information regarding the force applied by the input object.

The second electrode 410 and third electrode 411 are configured to actuate the piezoelectric material 404. Specifically, by selectively applying one or more differential voltages across the second electrode 410 and third electrode 411 the piezoelectric material 404 may be actuated to provide haptic feedback to a user. An example of such haptic feedback is illustrated in FIG. 4C. As shown in this figure, a differential voltage change applied across the second electrode 410 and third electrode 411 causes the piezoelectric material 104 to actuate which causes a haptic response that may be perceived by a user.

It should again be noted that in this embodiment the piezoelectric assembly 405 is used both in providing the haptic response and in determining force information.

The device 400 illustrated in FIGS. 4A-4C also includes a vent 420. Specifically, in FIGS. 4A-4C a vent 420 is formed in the spacing element 406. The vent 420 allows gas to exit and enter the spacing 414. Thus, when force is applied and the second electrode 410 moves relative to the first electrode 408, the vent 420 allows gas to leave the spacing 414. This prevents pressure from forming inside the spacing 414. Although the vent 420 is formed the spacing element 406, this is merely one example of where such a vent could be formed. For example, the vent could be formed in either the first substrate 402 or piezoelectric assembly 405.

Next, it should be noted that the various embodiments can be implemented with a wide variety of different electrode structures and materials. For example, the various electrodes may be implemented on different positions in or on the various substrates and materials.

Figure 5:
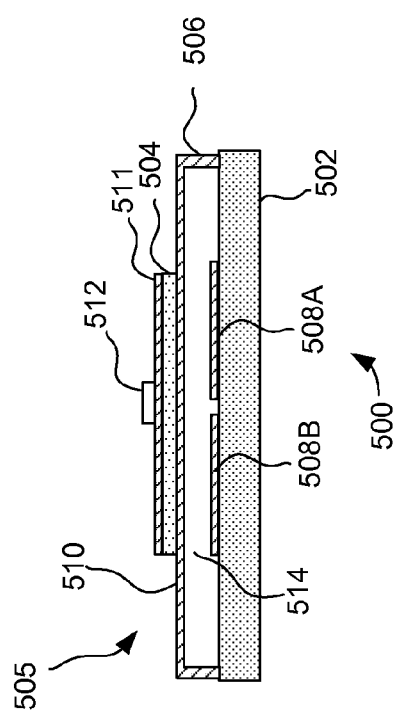
FIG. 5 is a cross-sectional side view of a force sensor in accordance with an embodiment of the invention.

Turning now to FIG. 5, an alternative embodiment of an input device 500 is illustrated. The input device 500 includes a first substrate 502, a piezoelectric assembly 505, a first electrode 508A, and a transmission element 512. The piezoelectric assembly 505 comprises a piezoelectric material 504, a second electrode 510, a third electrode 511, and a spacing element 506.

In contrast with the previously illustrated embodiments, the spacing element 506 in this embodiment is integrated with the piezoelectric assembly 505. Specifically, in this illustrated embodiment the spacing element 506 is formed as an extension of the second electrode 510. This extension is near the perimeter of the second electrode 510 and serves to provide a spacing 514 between first substrate 502 and the piezoelectric material 504. The spacing 514 is arranged such that at least a portion of the first electrode 508A and the second electrode 510 overlap the spacing 514. It should be noted that this is just one example of how the spacing element 506 may be integrated with the piezoelectric assembly 505. The spacing element may also be formed with the third electrode 511.

In this embodiment a fourth electrode 508B is disposed proximate to the first electrode 508A. The fourth electrode 508B and first electrode 508A comprise a transmitting electrode and a receiving electrode, respectively. This facilitates a "transcapacitive" measurement between the first electrode 508A, the fourth electrode 508B and the second electrode 510 to determine the change in the variable capacitance that occurs in response to applied force.

Figure 6:
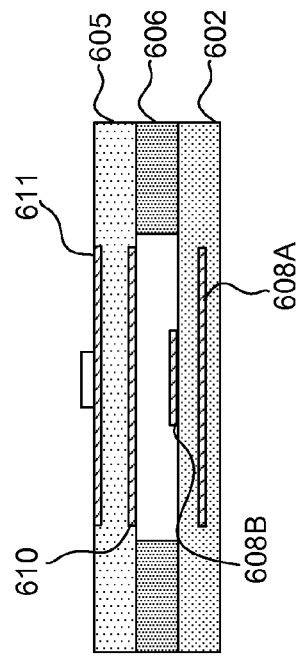
FIG. 6 is a cross-sectional side view of a force sensor in accordance with an embodiment of the invention.

Turning now to FIG. 6, a second alternative embodiment of an input device 600 is illustrated. Again, this embodiment is like those discussed above, with the main difference being that the first electrode 608A is embedded within the substrate rather being formed on, or adjacent to, an associated substrate. The fourth electrode 608B and first electrode 608A comprise a transmitting electrode and a receiving electrode. This facilitates a "transcapacitive" measurement between the first electrode 608A, the fourth electrode 608B and the second electrode 610 to determine the change in the variable capacitance that occurs in response to applied force.

In all of these examples, a variety of different materials and techniques can be used to form the various electrodes. For example, the first, second, third and/or fourth electrodes can be formed using a variety of material deposition techniques. As other examples, a conductive material such as metals or conductive oxides may be sputtered or plated on the substrate and then etched to leave behind the desired electrode pattern. In other examples, the electrode material can be printed directly on the substrate by screen printing. In yet another example the electrode material may be embedded directly into the corresponding substrate. Finally, in yet other embodiments, electrode structures may be formed separately and then attached to the appropriate substrate.

As specific examples, the various electrodes may be patterned using a conductive material, such as ITO (indium tin oxide), silver or carbon conductive ink, and copper. Further, any appropriate patterning process may be used in forming the electrode, including sputter deposition, printing, and etching.

A variety of piezoelectric materials and configurations may be used in the various embodiments. For example, ceramic or crystal piezoelectric material such as PZT (Lead zirconium titanate) or quartz (silicon dioxide) may be used. Additionally, these materials may be shaped in a variety of different arrangements.

A variety of materials may be used to provide the various other substrates in the input device. Common substrate materials such as polyimide (sold under the name Kapton®), polyethylene terephthalate (PET), polycarbonate, fiberglass, polymethyl methacrylate, metals, plastic, glass, and others may be used.

A variety of materials, shapes and structures may also be used to implement the transmission element. Examples of suitable materials for use in the transmission element include a wide range of materials, including relatively rigid materials such as plastics, glass and metals. Furthermore, in some embodiments the transmission element may be part of or otherwise integrated with the piezoelectric assembly. For example, the transmission element may be formed as part of the electrode structure of the piezoelectric assembly. This may be accomplished by "embossing/stamping" an appropriate transmission element feature in the electrode. Of course, this is again just one example.

In some implementations it may be desirable to provide a vent for facilitating gas expulsion and entry to/from the spacing when the second electrode is deflected relative to the first electrode. Such a vent may be formed in any suitable location, including the various substrates, electrodes, spacing elements and piezoelectric materials illustrated in FIGS. 1-6. For example, by providing a slit or other via from the spacing in the first, second, or spacing element to outside the device. Such a slit or via will allow gas to flow through the opening, thus reducing the force needed for the second electrode to deflect relative to the first electrode.

Finally, in some embodiments it may be desirable to provide additional layers between the first and second electrodes. For example, to avoid shorting between the first electrode and the second electrode during biasing an insulative layer may be formed there between. When such an insulative layer is sufficiently thin, deflection of the electrode will not be overly hindered and yet shorting between electrodes may be prevented.

The various embodiments illustrated and descried with reference to FIGS. 1-6 are particularly applicable to input devices that combine both proximity sensing and force sensing. In such embodiments, capacitive sensor electrodes may be configured to determine positional information for objects that are in a sensing region. In various implementations, the capacitive sensor electrodes may be implemented on the various substrates of the input device described in FIG. 1-6, as will described below. Such implementations offer significant potential advantages in that key components may be shared between the proximity sensor and the force sensor(s). Stated another way, these implementations allow force sensing to be added to a proximity sensor with relatively low additional cost and complexity.

Figure 7:
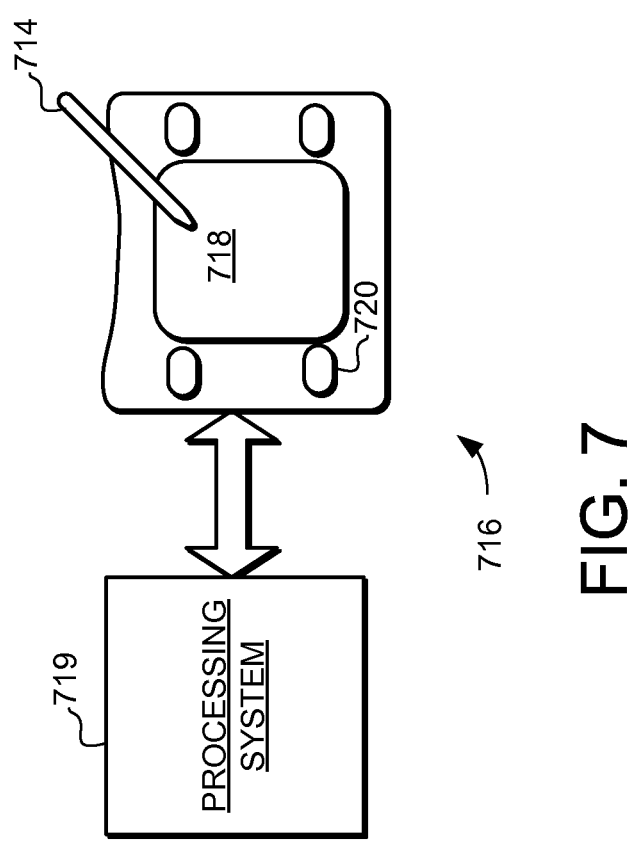
FIG. 7 is a block diagram of a input device in accordance with embodiments of the invention.

Turning now to FIG. 7, a block diagram illustrates an input device 716 that combines a proximity sensor with a plurality of force sensors. The input device 716 uses both the proximity sensor and the force sensors to provide an interface for the electronic system. The input device 716 has a processing system 719, a sensing region 718 and four force sensors 720 implemented proximate the sensing region 718. As will be described in greater detail below, each of the force sensors 720 may be implemented with any of the various embodiments of force sensing input devices described above and below, and thus may be configured to provide both force sensing and haptic feedback to a user. Furthermore, it should be noted that while the force sensors 720 are illustrated as being outside the sensing region 718, that in other embodiments one or more force sensors may be provided within the perimeter of the sensing region 718. Not shown in FIG. 7 is an array of sensing electrodes that are adapted to capacitively sense objects in the sensing region 718.

The input device 716 is adapted to provide user interface functionality by facilitating data entry responsive to position of sensed objects and the force applied by such objects. Specifically, the processing system 719 is configured to determine positional information for objects sensed by a sensor in the sensing region 718. This positional information can then be used by the system 700 to provide a wide range of user interface functionality.

Furthermore, the processing system 719 is configured to determine force information for objects from measures of force determined by the force sensors 720. This force information can then also be used by the system 700 to provide a wide range of user interface functionality. For example, by providing different user interface functions in response to different levels of applied force by objects in the sensing region.

Finally, the processing system 719 is configured to provide haptic feedback to users of the input device 716. This would typically be accomplished by selectively providing differential voltages across the piezoelectric material by applying appropriate signals to electrodes coupled to the piezoelectric material.

The input device 716 is sensitive to input by one or more input objects (e.g. fingers, styli, etc.), such as the position of an input object 714 within the sensing region 718. Sensing region 718 encompasses any space above, around, in and/or near the input device 716 in which the input device 716 is able to detect user input (e.g., user input provided by one or more input objects 714). The sizes, shapes, and locations of particular sensing regions may vary widely from embodiment to embodiment. In some embodiments, the sensing region 718 extends from a surface of the input device 714 in one or more directions into space until signal-to-noise ratios prevent sufficiently accurate object detection. The distance to which this sensing region 718 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 714, contact with an input surface (e.g. a touch surface) of the input device 714, contact with an input surface of the input device 714 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 718 has a rectangular shape when projected onto an input surface of the input device 714.

The input device 714 may utilize any combination of sensor components and sensing technologies to detect user input in the sensing region 718. The input device 714 comprises one or more sensing elements for detecting user input. As several non-limiting examples, the input device 714 may use capacitive, elastic, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 714, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 714, one or more sensing elements pick up loop currents induced by a resonating coil or pair of coils. Some combination of the magnitude, phase, and frequency of the currents may then be used to determine positional information.

In some capacitive implementations of the input device 714, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In FIG. 7, a processing system 719 is shown as part of the input device 716. The processing system 719 is configured to operate the hardware of the input device 716 to detect input in the sensing region 718. The processing system 719 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 719 also comprises electronically-readable instructions, such as firmware code, software code, and/or the like. In some embodiments, components composing the processing system 719 are located together, such as near sensing element(s) of the input device 716. In other embodiments, components of processing system 719 are physically separate with one or more components close to sensing element(s) of input device 716, and one or more components elsewhere. For example, the input device 716 may be a peripheral coupled to a desktop computer, and the processing system 719 may comprise software configured to run on a central processing unit of the desktop computer and one or more ICs (perhaps with associated firmware) separate from the central processing unit. As another example, the input device 716 may be physically integrated in a phone, and the processing system 719 may comprise circuits and firmware that are part of a main processor of the phone. In some embodiments, the processing system 719 is dedicated to implementing the input device 716. In other embodiments, the processing system 719 also performs other functions, such as operating display screens, driving haptic actuators, etc.

The processing system 719 may be implemented as a set of modules that handle different functions of the processing system 719. Each module may comprise circuitry that is a part of the processing system 719, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 719 responds to user input (or lack of user input) in the sensing region 718 directly by causing one or more actions. Example actions include changing operation modes, as well as GUI actions such as cursor movement, selection, menu navigation, and other functions. In some embodiments, the processing system 719 provides information about the input (or lack of input) to some part of the electronic system (e.g. to a central processing system of the electronic system that is separate from the processing system 719, if such a separate central processing system exists). In some embodiments, some part of the electronic system processes information received from the processing system 719 to act on user input, such as to facilitate a full range of actions, including mode changing actions and GUI actions.

For example, in some embodiments, the processing system 719 operates the sensing element(s) of the input device 716 to produce electrical signals indicative of input (or lack of input) in the sensing region 718. The processing system 719 may perform any appropriate amount of processing on the electrical signals in producing the information provided to the electronic system. For example, the processing system 719 may digitize analog electrical signals obtained from the sensor electrodes. As another example, the processing system 719 may perform filtering or other signal conditioning. As yet another example, the processing system 719 may subtract or otherwise account for a baseline, such that the information reflects a difference between the electrical signals and the baseline. As yet further examples, the processing system 719 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

Likewise, the term "force information" as used herein is intended to broadly encompass force information regardless of format. For example, the force information can be provided for each object as a vector or scalar quantity. As another example, the force information can be provided as an indication that determined force has or has not crossed a threshold amount. As other examples, the force information can also include time history components used for gesture recognition. As will be described in greater detail below, positional information and force information from the processing systems may be used to facilitate a full range of interface inputs, including use of the proximity sensor device as a pointing device for selection, cursor control, scrolling, and other functions.

In some embodiments, the input device 716 is implemented with additional input components that are operated by the processing system 719 or by some other processing system. These additional input components may provide redundant functionality for input in the sensing region 718, or some other functionality.

In some embodiments, the input device 716 comprises a touch screen interface, and the sensing region 718 overlaps at least part of an active area of a display screen. For example, the input device 716 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 716 and the display screen may share physical elements. For example, some embodiments may utilize some of the same electrical components for displaying and sensing. As another example, the display screen may be operated in part or in total by the processing system 719.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 719). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

As noted above, the input device 716 may be implemented with a variety of different types and arrangements of capacitive sensing electrodes. To name several examples, the capacitive sensing device may be implemented with electrode arrays that are formed on multiple substrate layers, including parts of the same layers used to form the force sensors. As one specific embodiment, electrodes for sensing in one direction (e.g., the "X" direction) may formed on a first layer (e.g., on a first side of the first substrates of FIGS. 1-6, or any other suitable substrate), while the electrodes for sensing in a second direction (e.g., the "Y" direction are formed on a second layer (e.g., on another side of the first substrate or any other suitable substrate).

In other embodiments, the electrodes for both the X and Y sensing may be formed on the same layer, with that same layer comprising any of the substrates described in FIGS. 1-6. In yet other embodiments, the electrodes may be arranged for sensing in only one direction, e.g., in either the X or the Y direction. In still another embodiment, the electrodes may be arranged to provide positional information in polar coordinates, such as "r" and "θ" as one example. In these embodiments the electrodes themselves are commonly arranged in a circle or other looped shape to provide "θ", with the shapes of individual electrodes used to provide "r". Also, a variety of different electrode shapes may be used, including electrodes shaped as thin lines, rectangles, diamonds, wedge, etc. Finally, a variety of conductive materials and fabrication techniques may be used to form the electrodes. As one example, the electrodes are formed by the deposition and etching of copper or ITO on a substrate.

Figure 8A:
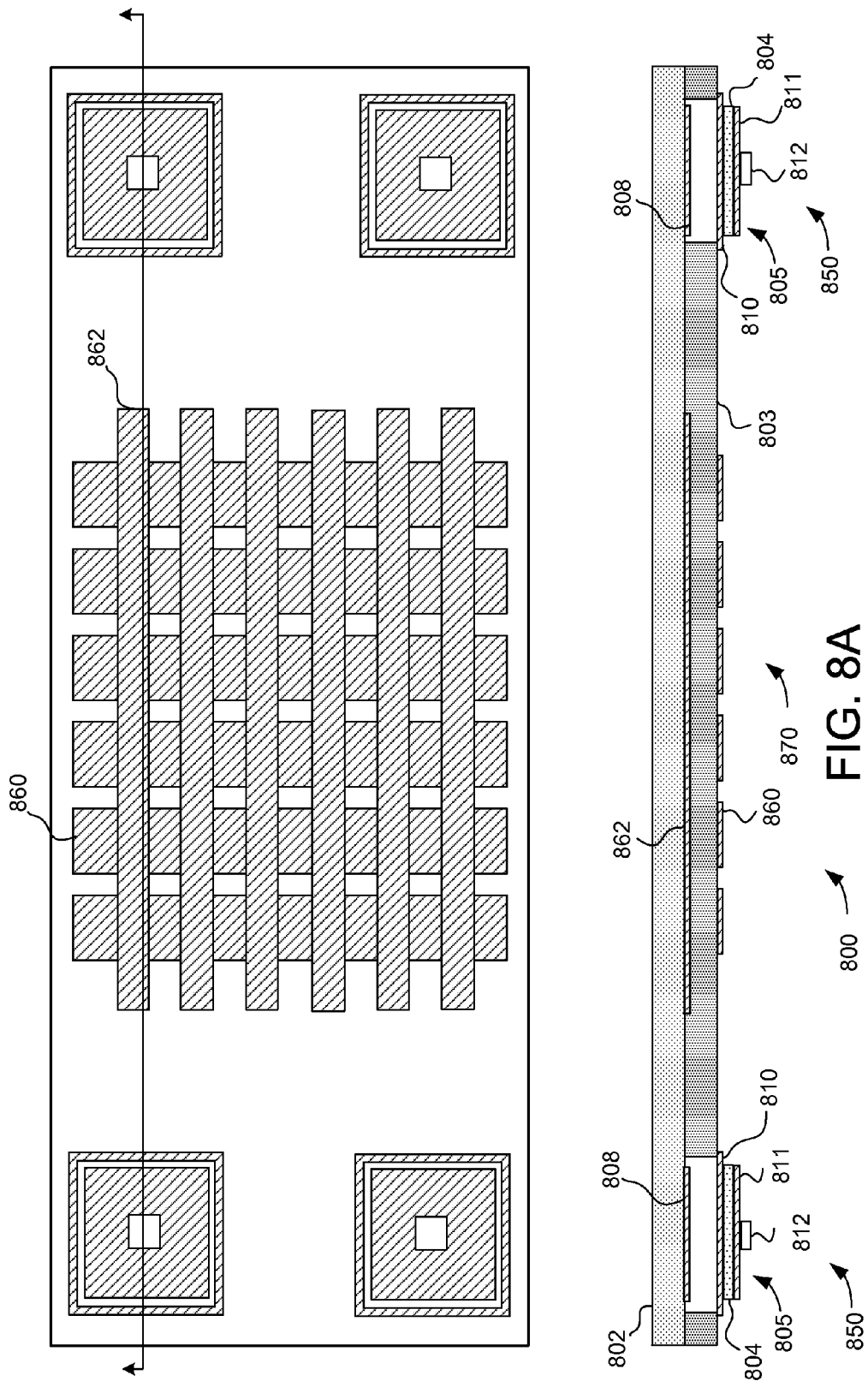

Turning now to FIG. 8A, cross-sectional and top views of input device 800 are illustrated. The input device 800 is implemented with four force sensors 850, one proximate each end, and a proximity sensor 870 between the force sensors 850. In this embodiment, the four force sensors 850 have a substantially square shape compared to the circular shaped force sensors illustrated previously. However, these are again just examples of the various shapes that may be used.

The input device 800 includes a first substrate 802 and a second substrate 803. Each force sensor 850 includes a first electrode 808, and a piezoelectric assembly 805. Each piezoelectric assembly comprises piezoelectric material 804, a second electrode 810, a third electrode 811 and a transmission element 812. The embodiment of FIG. 8A includes openings in the second substrate 803 arranged such that at least a portion of each first electrode 808 and each second electrode 810 overlap at one of the openings.

Between the force sensors 850 is an array of capacitive sensing electrodes. In the illustrated embodiment, the array of capacitive sensor electrodes comprises a first plurality of electrodes 862 disposed on the first substrate 802 and a second plurality of electrodes 860 disposed on the second substrate 803. As can be clearly seen in the top view, the first plurality of electrodes 862 and the second plurality of electrodes 860 are arranged in typically orthogonal directions. Such an arrangement can useful in both self capacitive and transcapacitive sensing devices and can thus be used to provide multi-object sensing. As such, the electrodes facilitate the capacitive detection of objects in the sensing region and the determination of positional information from that capacitive detection.

Returning to the force sensors 850, as with the embodiments described above, the first electrode 808 and the second electrode 810 define at least part of a variable capacitance. Measurements of this variable capacitance may be used to determine force information regarding a force that is biasing the transmission elements 812. Specifically, when an input object applies force, the transmission element 812 causes the second electrode 810 to move relative to the first electrode 808, thus changing the variable capacitance. A measurement of the change variable capacitance can be used to determine force information at the corresponding force sensors. The force information from the multiple sensors 850 can be combined to determine force information for objects being used to apply pressure.

And also as with the embodiments described above, the second electrode 810 and third electrode 811 are each configured to actuate the corresponding piezoelectric material 804. Specifically, by selectively applying one or more differential voltages across the second electrode 810 and third electrode 811 the piezoelectric material 804 may be actuated to provide haptic feedback to a user.

It should again be noted that in these force sensors 850, the second electrode 810 is used both in providing the haptic response and in determining force information. Furthermore, the piezoelectric assembly 805 is used both in providing the haptic response and in deforming in response to force. Furthermore, the proximity sensor 870 and the force sensors 850 may share common elements. Specifically, the embodiment of FIG. 8A shows the first plurality of electrodes 862 and the first electrode 808 of the force sensor 850 arranged on the first substrate 802 and the second substrate 803 where the second substrate 803 includes the opening between the first electrode 808 and the piezoelectric assembly 805.

Figure 8B:
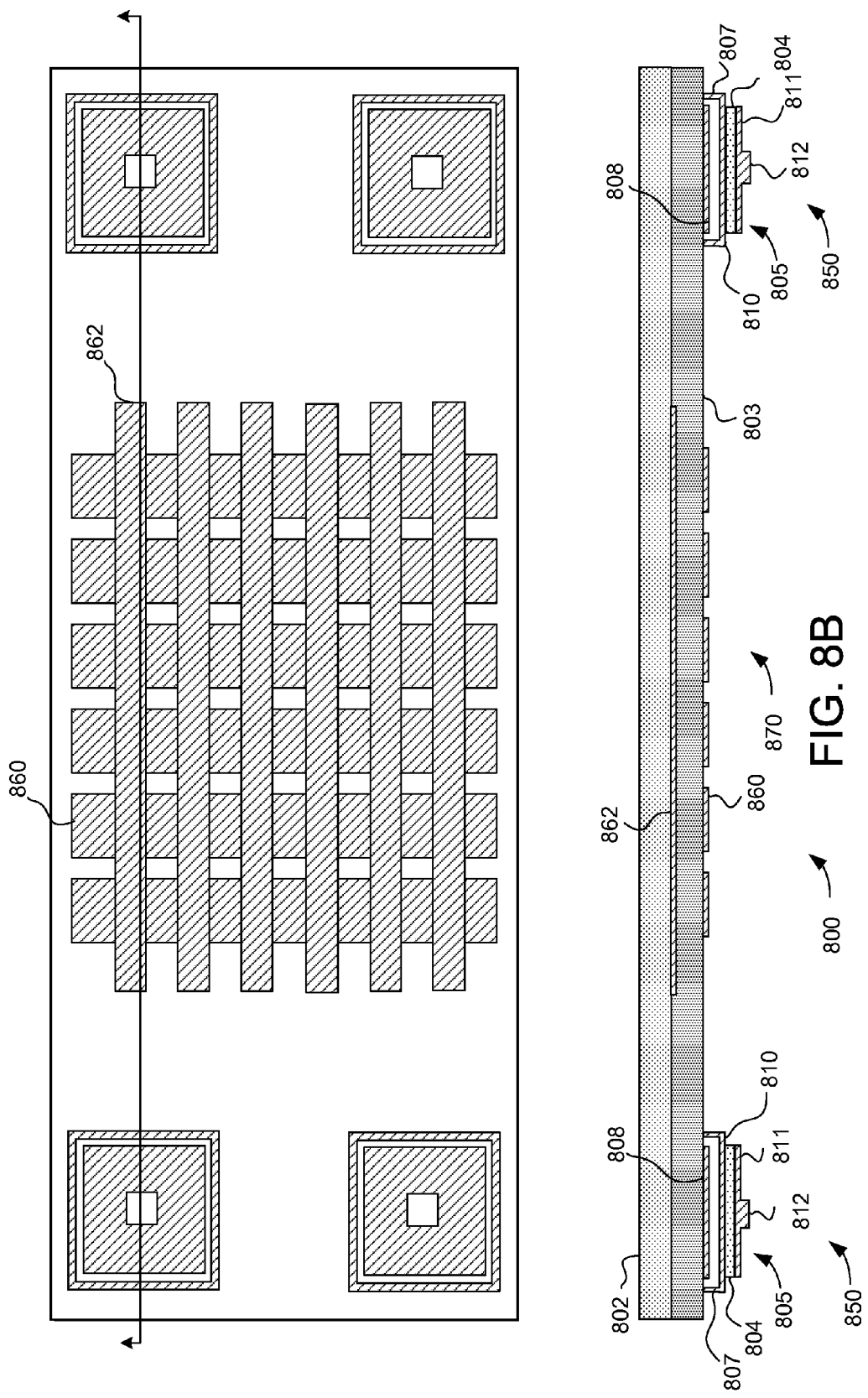

The embodiments of FIG. 8B show a similar embodiment with some variation. Specifically, in this embodiment the piezoelectric assembly 805 includes both the spacing element 807 and the transmission element 812 Specifically, in this illustrated embodiment the spacing elements 807 is formed as part of the second electrode 810 and the transmission element 812 is formed as part of the third electrode 811.

It should be noted that while FIG. 8A-B shows an example where the proximity sensor comprises a first plurality of electrodes 862 disposed on the first substrate 802 and a second plurality of electrodes 860 disposed on the second substrate 803, that this is just one example implementation. For example, the various capacitive sensing electrodes could instead be disposed on any suitable substrate.

To give several examples, in some capacitive sensors all the electrodes may be formed in one layer on the device. Such a device could thus be implemented with all the electrodes formed upon the first substrate 802, the second substrate 803, or another substrate. As another example, in some embodiments the electrodes may be formed on opposite sides of the same substrate. In any case, it should again be noted that the substrate layers used to provide capacitive sensing may also be used to form the force sensors.

In another embodiment, calibration sensors may be added to the input device. Specifically, a calibration sensor may be formed by disposing first and second sensor electrodes separated by a distance, using the same structures and techniques as used to construct the force sensors. However, the calibration sensors would typically not include a transmission element, and as such the first and second sensor electrodes will not be biased relative to each other in response to the application of force. Such calibration sensors will still provide a capacitance that can be measured, and that capacitance measure will change in response to temperature variations, source voltage variations, and other abnormalities. Because such measured changes in capacitance would only be in response to such variations, providing such a calibration sensor and measuring the capacitance changes may provide a way to compensate for these variations.

Figure 9:
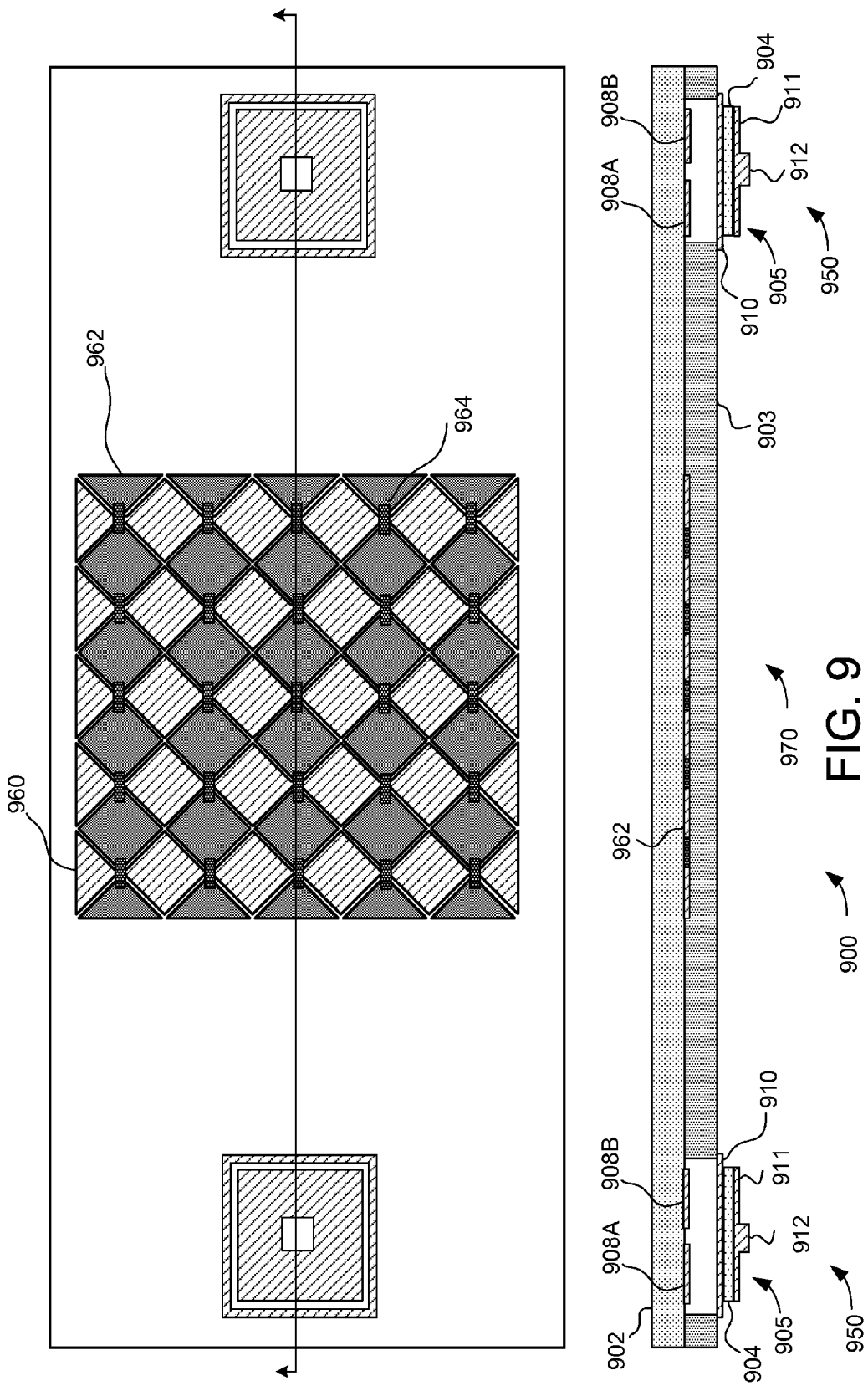

Turning now to FIG. 9, cross-sectional and top views of input device 900 are illustrated. The input device 900 is implemented with two force sensors 950, one proximate each end, and a proximity sensor 970 between the force sensors 950. The input device 900 includes a first substrate 902 and a second substrate 903 with openings. Each force sensor 950 includes a first electrode pair 908A and 908B and a piezoelectric assembly 905. Each piezoelectric assembly 905 comprises piezoelectric material 904, a second electrode 910, a third electrode 911, and a transmission element 912.

Between the force sensors 950 is an array of capacitive sensing electrodes. In the illustrated embodiment, the array of capacitive sensor electrodes comprises a first plurality of electrodes 960 and a second plurality of electrodes 962 that are both disposed in the same layer (on substrate 902). In those embodiments the first plurality of electrodes 960 may comprise the transmitter electrodes, while the second plurality of electrodes 962 may comprise the receiver electrodes. Specifically, the first plurality of electrodes 960 comprises a row of interconnected diamond shaped electrodes arranged in a first direction. Likewise, the second plurality of electrodes 962 comprises a row of diamond shaped electrodes connected by jumpers 964 and arranged in a second direction perpendicular to the first direction. When so configured, the electrodes facilitate the capacitive detection of objects in the sensing region and the determination of positional information from that capacitive detection.

Returning to the force sensors 950, as with the embodiments described above, the first electrode 908 and the second electrode 910 define at least part of a variable capacitance. However, in this embodiment each first electrode 908 comprises an electrode pair 908A-B. This facilitates the use of transcapacitive sensing to determine force information. Specifically, measurements of the variable transcapacitance between the transmitter electrode (e.g., 908A) and the receiver electrode (e.g., 908B) will be effected by the displacement of the second electrode 910. Specifically, when an input object applies force, the transmission element 912 causes the second electrode 910 to move relative to the first electrode pair 908A-B, thus changing the variable transcapacitance between the electrode pair 908A-B. A measurement of the change in transcapacitance can be used to determine force information at the corresponding force sensors. The force information from the multiple sensors 950 can be combined to determine force information for objects being used to apply pressure.

And also as with the embodiments described above, the second electrode 910 and third electrode 911 are each configured to actuate the corresponding piezoelectric material 904. Specifically, by selectively applying one or more differential voltages across the second electrode 910 and third electrode 911 the piezoelectric material 904 may be actuated to provide haptic feedback to a user.

It should again be noted that in these force sensors 950, the second electrode 910 is used both in providing the haptic response and in determining force information. Furthermore, the piezoelectric assembly 905 is used both in providing the haptic response and in deforming in response to force. This sharing of the second electrode 910 and the piezoelectric material 904 for two purposes provides the ability to do both haptic response and force determination with reduced cost and complexity. Furthermore, the proximity sensor 970 and the force sensors 950 share common elements. Specifically, first substrate 902 and second substrate 904.

Turning now to FIG. 10, cross-sectional and top views of an input device 1000 are illustrated. The input device 1000 is implemented with two force sensors 1050 and a proximity sensor 1070 between the force sensors 1050.

The input device 1000 includes a first substrate 1002 and a spacing element 1006. The force sensors 1050 each include piezoelectric assembly 1005 and a first electrode 1008. The piezoelectric assembly 1005 comprises a second electrode 1010, a third electrode 1011, piezoelectric material 1004 and a transmission element 1012. Again, between the force sensors 1050 is a proximity sensor 1070 that comprises an array of capacitive sensing electrodes 1060. It should be noted that the locations of the force sensors 1050 relative to the capacitive sensing electrodes 1060 is purely for illustrative purposes and should not be limited as described. In this illustrated embodiment, the array of capacitive sensor electrodes 1060 comprises a first plurality of electrodes 1061 and a second plurality of electrodes 1062, both of which are disposed on the first substrate 1002.

In this embodiment the force sensors 1050 are configured with piezoelectric assemblies 1005 that function to provide flexing in response to force. Thus, force biasing the transmission element 1012 causes the piezoelectric assembly 1005 to deform, allowing the second electrode 1010 to move relative to the first electrode 1008 to generate a change in capacitance from which force information may be calculated. Additionally, the second electrode 1010 and third electrode 1011 are again configured to actuate the piezoelectric material 1004. Specifically, by selectively applying one or more differential voltages across the second electrode 1010 and third electrode 1011 the piezoelectric material 1004 may be actuated to provide haptic feedback to a user.

Turning now to FIG. 11, a cross-sectional view of an input device 1100 is illustrated. The input device 1100 is implemented with two force sensors 1150, a proximity sensor 1170 and a first substrate 1102.

Again, the force sensors 1150 each include a piezoelectric assembly 1105 and a first electrode 1108. The piezoelectric assembly 1105 comprises a second electrode 1110, a third electrode 1111, piezoelectric material 1104 and a transmission element 1112. Also included is an array of capacitive sensing electrodes 1160 deposited on the first substrate 1102 that provide capacitive sensing for the proximity sensor 1170.

It should be noted that in this embodiment the force sensors 1150 overlap the capacitive sensing electrodes 1160, and thus may overlap the sensing region of the proximity sensor 1170. Such an embodiment may be desirable when the force sensors are required to be within the "footprint" of the proximity sensor 1170.

It should be noted that device elements illustrated in the FIGS described above are not necessarily drawn to scale. Furthermore, it should be noted that the various illustrations are simplified representations of what a typical device would include. For example, various illustrations show electrodes intruding into or on top of various substrates. It should be understood that such illustrations are used to illustrate what substrate various electrodes are deposited onto. It is understood by one skilled in the art that such electrodes do not prevent various substrates from contacting uniformly nor do the illustrations imply that various electrodes somehow intrude upon a substrate which may be contacting the electrodes.

The various devices and methods thus facilitate improved input device performance. The devices and methods utilize a first electrode disposed on a first substrate and a second electrode disposed on a second substrate, where the first electrode and the second electrode define at least part of a variable capacitance. A spacing element is arranged between the first substrate and the second substrate, the spacing element providing a spacer layer between the first and second substrates. The spacing element has a spacing arranged such that at least a portion of the first electrode and the second electrode overlap the opening. A transmission element is provided that is dimensioned to fit within a perimeter of the opening such that a force biasing the transmission element causes the piezoelectric assembly to deflect relative to the first electrode, thus changing the variable capacitance. A measurement of the variable capacitance can be used to determine force information regarding the force biasing the transmission element.

In one specific embodiment, the input device and method are implemented with capacitive sensor electrodes. In such an embodiment, the capacitive sensor electrodes may be configured to determine positional information for objects that are in a sensing region. In various implementations, the capacitive sensor electrodes may be implemented on the first substrate, piezoelectric material and/or third substrate. These implementations offer potential advantages of sharing components between the proximity sensor and the force sensor. Stated another way, these implementations allow force sensing to be added to a proximity sensor with relatively low additional cost and complexity.

What is claimed is:

1. An input device comprising:
    a first electrode disposed on a first substrate;
    a plurality of sensor electrodes disposed on the first substrate that capacitively detect objects in a sensing region;
    a piezoelectric assembly (PA) comprising:
        a piezoelectric material;
        a second electrode physically coupled to a first side of the piezoelectric material, the second electrode overlapping the first electrode,
        wherein the first electrode and the second electrode define at least part of a variable capacitance;
        a third electrode physically coupled to a second side of the piezoelectric material; and
        a transmission element physically coupled to the third electrode;
    a spacing element coupled to the first substrate and defining an opening between the first electrode and the second electrode,
    wherein the spacing element is static, and
    wherein the PA is configured to:
        deflect into the opening and change the variable capacitance in response to a force applied by a user that biases the transmission element relative to the first substrate, wherein the force is measured based on the change in the variable capacitance; and
        deform to generate a haptic response for the user; and
    a base substrate located below the transmission element, the first electrode, the second electrode, and the third electrode,
    wherein the base substrate pushes, in response to the force applied by the user, the transmission element in the opposite direction of the force applied by the user causing the PA to deflect in the opposite direction of the force applied by the user.

2. The input device of claim 1 further comprising a processing system communicatively coupled to the second electrode and the third electrode, the processing system configured to deform the piezoelectric material by selectively applying one or more differential voltages across the second and third electrodes.

3. The input device of claim 2 wherein the processing system is configured to generate physical motion in the input device by selectively deforming the piezoelectric material.

4. The input device of claim 1 further comprising a processing system communicatively coupled to the first electrode and the second electrode, the processing system configured to determine force information based on a capacitance value of the variable capacitance.

5. The input device of claim 4 wherein the processing system is configured to hold the second electrode at a constant voltage to determine the force information.

6. The input device of claim 1 further comprising:
    a fourth electrode disposed proximate to the first electrode on the first substrate, wherein the fourth electrode further defines the at least part of the variable capacitance; and
    a processing system communicatively coupled to the first electrode and the fourth electrode, the processing system configured to determine force information based on a capacitance value of the variable capacitance.

7. The input device of claim 1 further comprising a vent, the vent facilitating gas flow when the second electrode is deflected relative to the first electrode.

8. The input device of claim 1 wherein the transmission element is configured to overlap at least a portion of the second electrode and wherein the transmission element is further dimensioned to at least partially overlap the spacing element.

9. The input device of claim 1 wherein the spacing element is coupled to at least one of the second electrode, the third electrode and the piezoelectric material.

10. A method comprising:
   providing a first electrode disposed on a first substrate;
   providing a plurality of sensor electrodes disposed on the first substrate that capacitively detect objects in a sensing region;
   providing a piezoelectric assembly (PA) comprising:
      a piezoelectric material;
      a second electrode physically coupled to a first side of the piezoelectric material, the second electrode overlapping the first electrode,
      wherein the first electrode and the second electrode define at least part of a variable capacitance;
      a third electrode coupled to a second side of the piezoelectric material; and
      a transmission element coupled to the third electrode;
   providing a spacing element coupled to the first substrate and defining an opening between the first electrode and the second electrode,
   wherein the spacing element is static, and
   wherein the PA is configured to:
      deflect into the opening and change the variable capacitance in response to a force applied by a user that biases the transmission element relative to the first electrode, wherein the force is measured based on the change in the variable capacitance; and
      deform to generate a haptic response for the user; and
   providing a base substrate located below the transmission element, the first electrode, the second electrode, and the third electrode,
   wherein the base substrate pushes, in response to the force applied by the user, the transmission element in the opposite direction of the force applied by the user causing the PA to deflect in the opposite direction of the force applied by the user.

11. The method of claim 10 further comprising:
   selectively actuating the piezoelectric material by applying one or more differential voltages across the second and third electrodes; and
   determining force information based on the variable capacitance.

12. The method of claim 11 further comprising holding the second electrode at a constant voltage while the determining the force information.

* * * * *